US010303515B2

(12) United States Patent
Lee et al.

(10) Patent No.: US 10,303,515 B2
(45) Date of Patent: May 28, 2019

(54) METHOD AND APPARATUS FOR BATCH-PROCESSING MULTIPLE DATA

(71) Applicant: Samsung Electronics Co., Ltd., Gyeonggi-do (KR)

(72) Inventors: Chae-Heun Lee, Seoul (KR); Bo-Sung Kwak, Gyeonggi-do (KR); Myeong-Woo Koo, Gyeonggi-do (KR); Jeong-Min Park, Gyeonggi-do (KR); Jae-Woong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 396 days.

(21) Appl. No.: 15/041,753

(22) Filed: Feb. 11, 2016

(65) Prior Publication Data
US 2016/0239347 A1 Aug. 18, 2016

(30) Foreign Application Priority Data

Feb. 13, 2015 (KR) ........................ 10-2015-0022732

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4843* (2013.01)

(58) Field of Classification Search
CPC .................................................... G06F 9/5038
See application file for complete search history.

(56) References Cited

U.S. PATENT DOCUMENTS

| 8,689,185 B1 | 4/2014 | Myers et al. | |
| 2010/0302028 A1* | 12/2010 | Desai ............... | H04W 52/0258 340/539.3 |
| 2012/0124591 A1* | 5/2012 | Cadambi ................ | G06F 9/505 718/103 |
| 2012/0135726 A1* | 5/2012 | Luna ..................... | H04W 12/06 455/422.1 |
| 2012/0278397 A1 | 11/2012 | Lindsay et al. | |
| 2012/0310935 A1 | 12/2012 | Puzicha | |
| 2014/0280766 A1 | 9/2014 | Banerjee et al. | |
| 2014/0343896 A1 | 11/2014 | Le Grand et al. | |

OTHER PUBLICATIONS

European Search Report dated Jun. 23, 2016 issued in counterpart application No. 16155616.2-1957, 6 pages.
European Search Report dated Feb. 5, 2019 issued in counterpart application No. 16155616.2-1221, 10 pp.

* cited by examiner

*Primary Examiner* — Emerson C Puente
*Assistant Examiner* — Steven M Do
(74) *Attorney, Agent, or Firm* — The Farrell Law Firm, P.C.

(57) ABSTRACT

A method and apparatus for batch-processing multiple data in an electronic device are provided. A method for batch-processing multiple data in a first processor includes transmitting batching data configuration information to a second processor of the electronic device according to batching option information of at least one application; receiving, from the second processor, batching data including at least one data acquired via at least one sensor of the electronic device based on the batching data configuration information; and batch-processing the received batching data according to the batching option information, for the at least one application.

25 Claims, 12 Drawing Sheets

METHOD AND APPARATUS FOR BATCH-PROCESSING MULTIPLE DATA

PRIORITY

This application claims priority under 35 U.S.C. § 119(a) to Korean Patent Application Serial No. 10-2015-0022732, which was filed in the Korean Intellectual Property Office on Feb. 13, 2015, the entire disclosure of which is incorporated herein by reference.

BACKGROUND

1. Field of the Invention

The present disclosure relates generally to a method and apparatus for batch-processing multiple data, and more particularly, to a method and apparatus for batch-processing multiple data according to option information of at least one application.

2. Description of the Related Art

The recent dramatic development of information and communication technology and semiconductor technology has led to an increasing proliferation and use of a variety of types of portable terminals. Particularly, recent portable terminals have reached a mobile convergence phase by going beyond the traditional functions of portable terminals to cover function areas of other types of terminals. For example, in addition to the traditional communication functionalities of voice call and message transmission and reception, recent mobile communication terminals may now be equipped with various other functions, such as television (TV) viewing, music playback, camera, and Internet browsing.

Furthermore, recent portable terminals have various sensors, and applications have been developed to provide services related to fitness, location tracking, and monitoring to users by recognizing the surroundings of the portable terminals and the current states of users and/or the portable terminals via the sensors. For example, the traveling path of a moving portable terminal can be tracked in real time and displayed on a map on a display, such as a touch screen. Since such an application is executed in interaction with various sensors included in the portable terminal, such as a Global Positioning System (GPS), an accelerometer, an angular speed sensor, a temperature sensor, a pressure sensor, an atmospheric pressure sensor, a fluid sensor, a geomagnetic sensor, an optical sensor, a sound sensor, a taste sensor, and a smell sensor, such an application may be executed in the background during execution of another application, may be executed simultaneously with another application, or may be configured to quickly process a relatively large amount of data. Accordingly, such a portable terminal requires a high-performance processor.

Typically, the portable terminal operates with a small-size, small-capacity battery. As various applications are executed through a high-performance processor as described above, power is fast consumed.

To avert problems related with power consumption of high-performance processors, efforts have been made to reduce power consumption by a data batching scheme in which a low-power processor collects data measured in various sensors, stores the collected data for a predetermined time, and transmits the collected data in a batch to a high-performance processor at a specific time.

In conventional data batching schemes, however, data of various sensors collected by the low-power processor are transmitted in a batch to the high-performance processor. Thus, each application receives all of the collected sensor data from the low-power processor, rather than selectively receiving only data necessary to be used by the application. As a result, unnecessary data transmission occurs and the application must rearrange the received data into a form required by the processor. This operation is redundantly performed in every application. Moreover, since both the low-power processor and the high-performance processor must store unnecessary data, memory capacity is wasted.

SUMMARY

The present disclosure is made to address at least the above-mentioned problems and/or disadvantages and to provide at least the advantages described below. Accordingly, an aspect of the present disclosure is to provide a method and apparatus for batch-processing multiple data, which can minimize power consumption, allow a main processor to actively select multiple batching data to be batch-processed at a low-power processor interacting with at least one sensor, and provide the batch-processed multiple batching data in a form optimized for each application by batch-processing sensor data collected continuously through the low-power processor for the main processor.

In accordance with an aspect of the present disclosure, there is provided a method for batch-processing multiple data in a first processor of an electronic device. The method includes transmitting batching data configuration information to a second processor of the electronic device according to batching option information of at least one application; receiving, from the second processor, batching data including at least one data acquired via at least one sensor of the electronic device based on the batching data configuration information; and batch-processing the received batching data according to the batching option information, for the at least one application.

In accordance with another aspect of the present disclosure, there is provided a first processor of an electronic device for batch-processing multiple data between the first processor and a second processor of the electronic device. The first processor includes a memory for storing at least a part of at least one application for execution by the first processor; and a batch-processing controller configured to control transmission of batching data configuration information to the second processor according to batching option information of the at least one application, reception of batching data including at least one data acquired via at least one sensor of the electronic device based on the batching data configuration information from the second processor, and batch-processing of the received batching data according to the batching option information, for the at least one application.

In accordance with another aspect of the present disclosure, there is provided a second processor of an electronic device for batch-processing multiple data between a first processor of the electronic device and the second processor. The second processor includes a data module configured to store data acquired from at least one sensor; and a controller configured to control reception of batching data configuration information according to batching option information of at least one application from a first processor and to control transmission of batching data including at least one data acquired by the data module via at least one sensor of the electronic device to the first processor.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
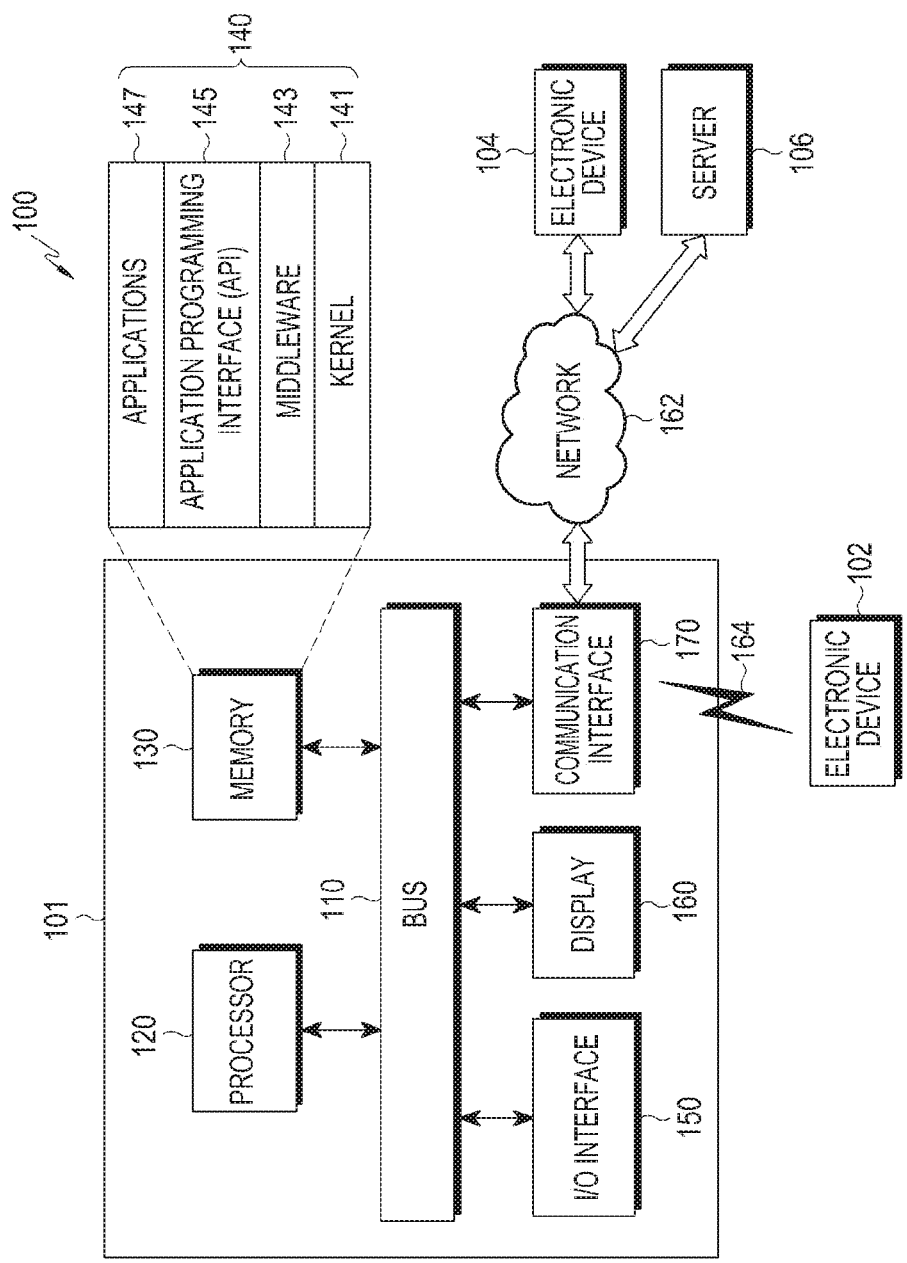
FIG. 1 is a block diagram illustrating a network environment including an electronic device according to various embodiments of the present disclosure.

Hereinafter, various embodiments of the present disclosure are described with reference to the accompanying drawings. However, the scope of the present disclosure is not limited to the particular embodiments and it is to be understood that the present disclosure covers all modifications, equivalents, and/or alternatives falling within the scope and spirit of the present disclosure. In descriptions of the drawings, like reference numerals may denote the same or similar components.

Herein, terms are used merely for the purpose of describing particular embodiments and are not intended to limit the scope of other embodiments. For example, as used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms that are defined in a general dictionary are to be interpreted to have the same meanings as the contextual meanings in the relevant field of the art, and are not to be interpreted to have ideal or excessively formal meanings unless clearly defined as such herein.

Herein, the terms 'have', 'may have', 'include', or 'may include' signify the presence of a specific feature (e.g., a number, a function, an operation, or a component like a part), but these terms do not exclude the presence of additional features.

Herein, the terms 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

Herein, terms such as 'first' or 'second' may modify the names of various components irrespective of sequence and/or importance, not limiting the components. These terms may be used to distinguish one component from another component. For example, a first user equipment (UE) and a second UE may indicate different UEs, irrespective of sequence or importance. For example, a first component may be referred to as a second component and vice versa without departing the scope of the present disclosure.

When a component (e.g., a first component) is referred to as being 'operatively or communicatively coupled with/to' or 'connected to' another component (e.g., a second component), it should be understood that the first component is connected to the second component directly or through any other component (e.g., a third component). However, when it is said that a component (e.g., a first component) is 'directly connected to' or 'directly coupled to' another component (e.g., a second component), it may be understood that there is no other component (e.g., a third component) between the components.

The term 'configured to' as used herein may be interchangeable with, for example, the terms 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

The terms as used in the present disclosure are merely provided to describe specific embodiments, and are not intended to limit the scope of other embodiments. It is to be understood that singular forms of terms include plural referents as well, unless the context clearly dictates otherwise. The terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the present disclosure may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an motion picture experts group (MPEG)-1 audio layer-3 (MP3) player, a mobile medical equipment, a camera, and a wearable device. According to various embodiments, the wearable device may be at least one of an accessory type (for example, a watch, a ring, a bracelet, a necklace, glasses, contact lenses, or a head-mounted device (HMD), fabric or clothes type (for example, electronic clothes), a body-attached type (for example, a skin pad or a tattoo), and an implantable type (for example, an implantable circuit).

An electronic device may also be a smart home appliance, such as a television (TV), a digital versatile disk (DVD) player, an audio player, a refrigerator, an air conditioner, a vacuum cleaner, an oven, a micro oven, a washer, an air purifier, a set-top box, a home automation control panel, a security control panel, a TV box (e.g., Samsung HomeSync®, Apple TV®, Google TV®, or the like), a game console (e.g., Xbox®, PlayStation®, or the like), an electronic dictionary, an electronic key, a camcorder, and an electronic picture frame.

An electronic device may also include a medical device (e.g., a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of Things (IoT) device (e.g., a light bulb, various sensors, an electricity or gas meter, a sprinkler, a fire alarm, a thermostat, a street lamp, a toaster, sports goods, a hot water tank, a heater, or a boiler), and the like.

An electronic device may also include furniture, part of a building/structure, an electronic board, an electronic signature receiving device, a projector, and various measuring devices (for example, water, electricity, gas or electromagnetic wave measuring devices). An electronic device may also include a combination of two or more of the foregoing devices. An electronic device may also be a flexible electronic device. In addition, it will be apparent to one having ordinary skill in the art that electronic devices according to embodiments of the present disclosure are not limited to the foregoing devices and cover new electronic devices produced along with technological developments.

Herein, the term 'user' may refer to a person or device (e.g., artificial intelligence electronic device) that uses an electronic device.

FIG. 1 is a block diagram illustrating a network environment including an electronic device according to an embodiment of the present disclosure.

Referring to FIG. 1, an electronic device 101 in a network environment 100 includes a bus 110, a processor 120, a memory 130, an input/output (I/O) interface 150, a display 160, and a communication interface 170. Alternatively, at least one of the components may be omitted in the electronic device 101 and/or a component may be added to the electronic device 101.

The bus 110 may include a circuit that interconnects, for example, the foregoing components 110 to 180 and allows communication (e.g., control messages and/or data) between the foregoing components 110 to 180.

The processor 120 may include one or more of a CPU, an AP, a supplementary processor (SP), and a communication processor (CP). The processor 120 may execute, for example, computation or data processing related to control and/or communication of at least one other component of the electronic device 101.

The memory 130 may include a volatile memory and/or a non-volatile memory. The memory 130 may, for example, store instructions or data related to at least one other component. The memory 130 may store software and/or programs 140.

In FIG. 1, the programs 140 include, for example, a kernel 141, middleware 143, an application programming interface (API) 145, and application programs (i.e., applications) 147. With respect to the processor 120, applications 147 refer to memory storing at least a portion of the corresponding applications for execution of these applications by the processor 120. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access and control or manage individual components of the electronic device 101.

The middleware 143 may serve as a medium through which the kernel 141 may communicate with the API 145 or the application programs 147 to transmit and receive data. Also, the middleware 143 may process one or more task requests received from the application programs 147. For example, the middleware 143 may assign priorities for using system resources (the bus 110, the processor 120, or the memory 130) of the electronic device 101 to at least one of the application programs 147. For example, the middleware 143 may perform scheduling or load balancing for the one or more task requests according to the priorities assigned to the at least one application program 147.

The API 145 is an interface that may control functions that the application programs 147 provide at the kernel 141 or the middleware 143. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, or a symbol) to the user. The display 160 may include a touch screen for receiving a touch input, a gesture input, a proximity input, or a hovering input through an electronic pen or a user's body part.

The communication interface 170 may establish communication between the electronic device 101 and an external device (e.g., a first external electronic device 102, a second external electronic device 104, or a server 106). For example, the communication interface 170 may be connected to a network 162 by wireless or wired communication and communicate with the external device (e.g., the second external electronic device 104 or the server 106) over the network 162.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM)), as a cellular communication protocol. The wireless communication may include, for example, short-range communication 164. The short-range communication 164 may be conducted by, for example, at least one of wireless fidelity (WiFi), Bluetooth, near field communication (NFC), and GNSS. GNSS may include, for example, at least one of global positioning system (GPS), global navigation satellite system (Glonass), Beidou navigation satellite system, and Galileo, the European global satellite-based navigation system. In the present disclosure, the terms 'GPS' and 'GNSS' are interchangeably used with each other. The wired communication may be conducted in conformance to standards, such as, for example, universal serial bus (USB), high definition multimedia interface (HDMI), recommended standard 232 (RS-232), and plain old telephone service (POTS). The network 162 may be a communication network, for example, at least one of a computer network (for example, local area network (LAN) or wide area network (WAN)), the Internet, and a telephone network.

Each of the first and second external electronic devices 102 and 104 may be the same type or different types of devices as the electronic device 101. The server 106 may include a group of one or more servers. All or a part of operations performed in the electronic device 101 may be performed in one or more other electronic devices 102, 104 or the server 106. If the electronic device 101 is to perform a function or a service automatically or upon request, the electronic device 101 may send a request for at least a part of functions related to the function or the service to another device 102, 104 or the server 106, instead of performing the function or the service autonomously, or additionally. The another device may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

The processor 120 is a main processor, which may include a high-power processor, that is, an AP having a high-performance CPU for implementing a user interface (UI) and performing complicated computation and a large-capacity memory, and a lower-power processor, i.e., an SP having a lower-performance CPU and a smaller-capacity memory than the AP.

The AP may process at least part of information acquired from other components (for example, at least one of the processor 120, the memory 130, the I/O interface 150, and the communication interface 170), and use the processed information in various manners. For example, the AP may control at least a part of the functions of the electronic device 101 so that the electronic device 101 may interact with another electronic device 102, 104, or the server 106. The AP may be incorporated into the processor 120 or the communication interface 170. According to an embodiment of the present disclosure, at least one component of the AP may be included in the server 106 and the server 106 may support at least one of the operations performed by the AP. Herein, the AP may have the same configuration as the processor 120. The AP may be referred to as, for example, a 'main processor', a 'first processor', 'processor 1', a 'CPU', a 'high-power processor', or a 'high-specification processor'.

The SP is a processor configured separately from the processor 120 and the AP to be optimized for a low-power operation. The SP may be configured to have a lower computation capability, more limited interfaces, and a more limited memory than the AP, to thereby minimize current consumption relatively and thus operate continuously. The SP may, for example, collect sensing data in interaction with at least one sensor (e.g., an accelerometer, a gyro sensor, a magnetic sensor, etc.) and obtain context data representing an action state of a user (e.g., sitting, standing, walking, running, or etc.) using the collected sensing data. The SP may be referred to as, for example, a 'sub-processor', a 'second processor', 'processor 2', a 'sensor hub', a 'microcontroller', or a 'sensing processor'.

The AP may transmit batching data configuration information to the SP according to batching option information of at least one application 147. The application 147 may provide a function related to, for example health care (e.g., measuring the amount of exercise, a blood sugar level, calories, etc.), provisioning of environment information (e.g., provisioning of atmospheric pressure, humidity, or temperature information), or state recognition (e.g., location tracking, provisioning of information about an action state, etc.). The application 147 may also transmit the batching option information indicating the type of data acquired from at least one sensor required to perform an operation, and a selected data arrangement scheme to the AP, so as to request the AP to configure data to be batch-processed according to the data type and data arrangement scheme indicated by the batching option information and batch-process the configured data. The AP may configure batching data configuration information based on all data types indicated by the batching option information of the at least one application 147 and data arrangement schemes indicated by the batching option information of the at least one application 147 (i.e., time-ordered arrangement or arrangement by data type), and transmit the batching information configuration information to the SP, so that the SP may batch-process batching data including at least one data acquired based on the batching data configuration information.

The batching option information includes information about data that is required by the application 147 to perform batch-processing. The batching option information may include information about at least one of the type of data to be batch-processed and a data arrangement scheme.

For example, the batching option information may indicate, as a data type, sensing data collected from at least one sensor required for an operation of the application 147 or context data obtained using the sensing data. The SP may acquire the sensing data or the context data. The context data is information that may be calculated using at least one sensing data acquired from a sensor, including information about a distance, a speed, an altitude, calories, the number of gaits, state recognition, etc. For example, context data regarding user state recognition may include data indicating an action state of a user, determined by comparing sensing data acquired from an accelerometer, a gyro sensor, a magnetic sensor, etc. with the waveform of a patter characteristic of each predetermined action state. The context data may be information indicating an action state of a user such as sitting, standing, being stationary, walking, running, biking, riding in a vehicle, etc., which is determined based on a pattern of sensing data acquired from a sensor such as the period of waveforms, a strength, vibrations, or the like. Further, the context data may be information obtained by performing simple computation on sensing data (an atmospheric pressure value) acquired from an atmospheric pressure sensor, such as altitude information that cannot be acquired just with raw sensing data. The data arrangement scheme indicates how to arrange sensing data collected from at least one sensor and thus configure batching data. The data arrangement scheme may indicate at least one of arrangement of at least one data chronologically and arrangement of data by type. Sensing data acquired from at least one sensor may, for example, be arranged sequentially chronologically in the time-ordered data arrangement scheme, whereas sensing data acquired from sensors selected from among at least one sensor may be arranged distinguishably by data type in the data type-based data arrangement scheme.

The batching data configuration information includes information about the configuration of batching data to be received from the SP. The batching data configuration information may include information about at least one of every data type and every data arrangement scheme indicated by each piece of batching option information received from the at least one application 147.

For example, if each piece of batching option information indicates a different data arrangement scheme, at least one representative data arrangement scheme may be determined and included in the batching data configuration information. For example, the at least one application 147 may be prioritized and a representative data arrangement scheme may be determined based on the priority level of the at least one application 147. The priority level of an application 147 may be determined using at least one of an operation time and the number of uses. Alternatively, the at least one piece of batching option information may be prioritized and a representative data arrangement scheme may be determined based on the priority level of the at least one piece of batching option information. The priority level of batching option information may be determined using the number of data types indicated by the batching option information.

The SP may acquire data selectively, based on the received batching data configuration information, and transmit batching data including at least one acquired data to the AP.

The SP may check a data type indicated by the batching data configuration information received from the AP and selectively acquire only data of the checked data type. For example, the SP may activate only a sensor from which to acquire sensing data from among one or more sensors included in the electronic device 101, based on the batching data configuration information, acquire sensing data from the activated sensor, and store the acquired sensing data. If the checked data type is context data, the SP may perform a computation operation to obtain context data, calculate the context data using sensing data needed to acquire the context data, and store the context data.

If a predetermined batch-processing condition is satisfied during storage of the acquired data, the SP may configure batching data with the stored data and transmit the configured batching data to the AP. For example, the predetermined batch-processing condition may include at least one of elapse of a predetermined batch-processing period, reaching a threshold memory capacity, reception of a batch-processing request signal, reaching an inter-processor transmission capacity, and attaining a predetermined inter-processor transmission speed. Further, the SP may configure batching data by arranging the stored data in a data arrangement scheme indicated by the batching data configuration information. For example, the acquired data may be arranged in the data arrangement scheme indicated by the batching data configuration information and then stored during a storing operation. Alternatively, the data may be arranged in the data arrangement scheme indicated by the batching data configuration information, and then configured into batching data during a batching data configuration operation.

The AP may batch-process the received batching data for the at least one application 147 according to the batching option information.

The AP may rearrange the batching data received from the SP according to the batching option information of the at least one application 147. The AP may provide the rearranged batching data to each of the at least one application 147. For example, the AP may rearrange the received batching data according to a data arrangement scheme and a data type indicated by at least one piece of batching option information. The AP may provide the rearranged batching data corresponding to the batching option information of each application 147.

Figure 2:
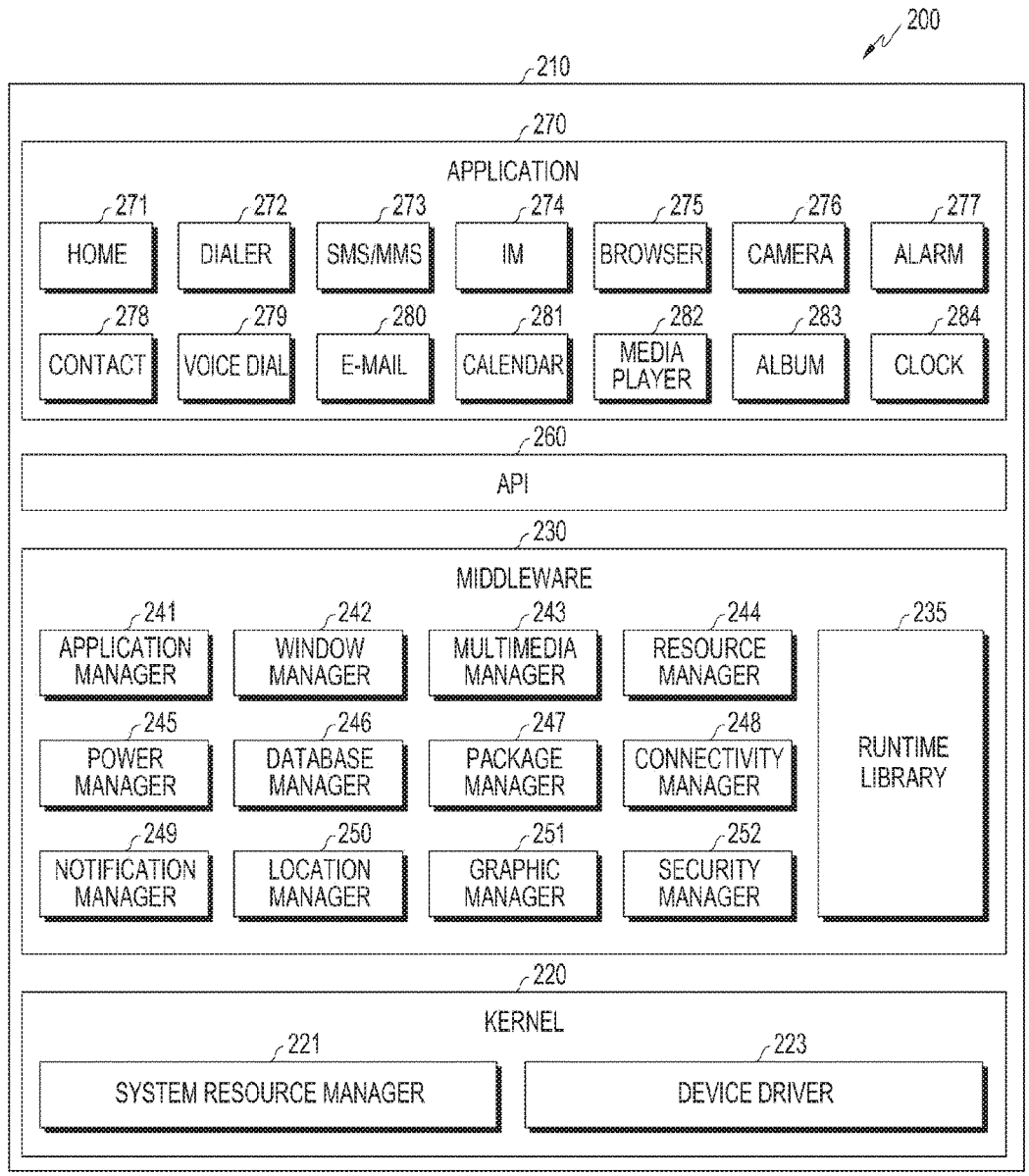
FIG. 2 is a block diagram illustrating a programming module according to various embodiments of the present disclosure.

FIG. 2 is a block diagram illustrating a programming module according to an embodiment of the present disclosure.

Referring to FIG. 2, a programming module 210 may include an OS that controls resources related to an electronic device in which it is installed and/or various applications executed on the OS. For example, the OS may be Android®, iOS®, Windows®, Symbian®, Tizen®, Bada®, etc.

The programming module 210 includes a kernel 220, middleware 230, an Application Programming Interface (API) 260, and applications 270. At least a part of the programming module 210 may be preloaded on an electronic device or downloaded from a server.

The kernel 220 includes, for example, a system resource manager 221 and a device driver 223. The system resource manager 221 may control, allocate, or deallocate system resources. The system resource manager 221 may include a processor manager, a memory manager, and/or a file system manager. The device driver 223 may include, for example, a display driver, a camera driver, a Bluetooth driver, a shared memory driver, a USB driver, a keypad driver, a Wi-Fi driver, an audio driver, or an inter-process communication (IPC) driver.

The middleware 230 may, for example, provide a function required in common for the applications 270, or provide various functionalities to the applications 270 through the API 260 so that the applications 270 may efficiently use limited system resources available within the electronic device. The middleware 230 includes, for example, a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses to add a new function in a programming language during execution of an application 270. The runtime library 235 may perform input/output management, memory management, a function related to arithmetic function, etc.

The application manager 241 may manage, for example, the life cycle of at least one of the applications 270. The window manager 242 may manage graphical user interface (GUI) resources used for a screen. The multimedia manager 243 may determine formats required to play back various media files and may encode or decode a media file using a CODEC suitable for the format of the media file. The resource manager 244 may manage resources such as a source code of at least one of the applications 270, a memory, or storage space.

The power manager 245 may, for example, manage a battery or a power source by operating in conjunction with a basic input/output system (BIOS) and may provide power information required for an operation. The database manager 246 may manage a database for at least one of the applications 270 so that the database may be generated, searched, or modified. The package manager 247 may manage installation or update of an application distributed as a package file.

The connectivity manager 248 may manage, for example, wireless connectivity of Wi-Fi, Bluetooth, etc. The notification manager 249 may indicate or output a notification of an event, such as message arrival, a schedule, a proximity alarm, or the like in a manner that does alerts a user without disturbing the user. The location manager 250 may mange position information about the electronic device. The graphic manager 251 may manage graphical effects to be provided to the user or related user interfaces. The security manager 252 may provide an overall security function required for system security, user authentication, etc. If the electronic device 101 has a telephony function, the middleware 230 may further include a telephony manager to manage a voice or video call function of the electronic device.

A new middleware module may be created and used by combining various functions of the above-described component modules in the middleware 230. The middleware 230 may provide a customized module for each OS type in order to provide differentiated functions. The middleware 230 may dynamically delete a part of existing components and/or add new components.

The API 260 is a set of API programming functions, which may be configured differently for each OS. For example, when Android® or iOS®, an API set may be provided on a per platform basis, whereas when using Tizen®, two or more API sets may be provided on a per platform basis.

The applications 270 include applications capable of providing functions, such as, for example, home 271, dialer 272, short message service/multimedia messaging service (SMS/MMS) 273, Instant message (IM) 274, browser 275, camera 276, alarm 277, contacts 278, voice dial 279, email 280, calendar 281, media player 282, album 283, or clock 284, health care (e.g., measurement of an exercise amount or a glucose level), or providing environment information (e.g., information about atmospheric pressure, humidity, or temperature).

The applications 270 may also include an information exchange application that supports information exchange between the electronic device and an external electronic device. The information exchange application may include, for example, a notification relay application for transmitting specific information to the external electronic device or a device management application for managing the external electronic device.

For example, the notification relay application may include a function of transmitting notification information generated from another application (e.g., an SMS/MMS application, an email application, a health care application, or an environment information application) to the external electronic device. The notification relay application may also, for example, receive notification information from the external electronic device and transmit the received notification information to a user.

The device management application may manage (e.g., install, delete, or update), for example, at least a part of functions of the external electronic device communicating with the electronic device (for example, turn-on/turn-off of the external electronic device (or a part of its components) or control of the brightness (or resolution) of the display), an application executed in the external electronic device, or a service (e.g., a call service or a message service) provided by the external electronic device.

The applications 270 may include, for example, an application (e.g., a health care application) designated according to a property of the external electronic device, such as the type of electronic device (e.g., whether the electronic device is a mobile medical device). The applications 270 may include an application received from an external electronic device. The applications 270 may include a preloaded application or a third party application downloadable from a server. The names of components of the programming module 210 according to embodiment of the present disclosure may vary according to the type of an OS.

At least a part of the programming module 210 may be implemented in software, firmware, hardware, or a combination of at least two of them. For example, least a part of the programming module 210 may be implemented (e.g., executed) by the processor. At least a part of the programming module 210 may include, for example, a module, a program, a routine, a set of instructions, or a process to execute one or more functions.

The term "module", as used herein, may be defined in a manner that includes its ordinary definition, including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor, one or more processors may execute functions corresponding to the commands. The computer-readable storage medium may be, for example, a memory.

The computer-readable medium may include a hard disk, a floppy disk, magnetic media (e.g., magnetic tape), optical media (e.g., a compact disc read-only memory (CD-ROM)), a digital versatile disc (DVD), magneto-optical media (e.g., floptical disk), hardware devices (for example, read-only memory (ROM), random access memory (RAM) or flash memory)), etc. Program instructions may include machine language code produced by a compiler, or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. Embodiments are provided for description and understanding of the present disclosure, not limiting the scope of the present disclosure. Accordingly, the scope of the present disclosure should be interpreted as including all modifications or various embodiments within the scope of the present disclosure therein.

Figure 3:
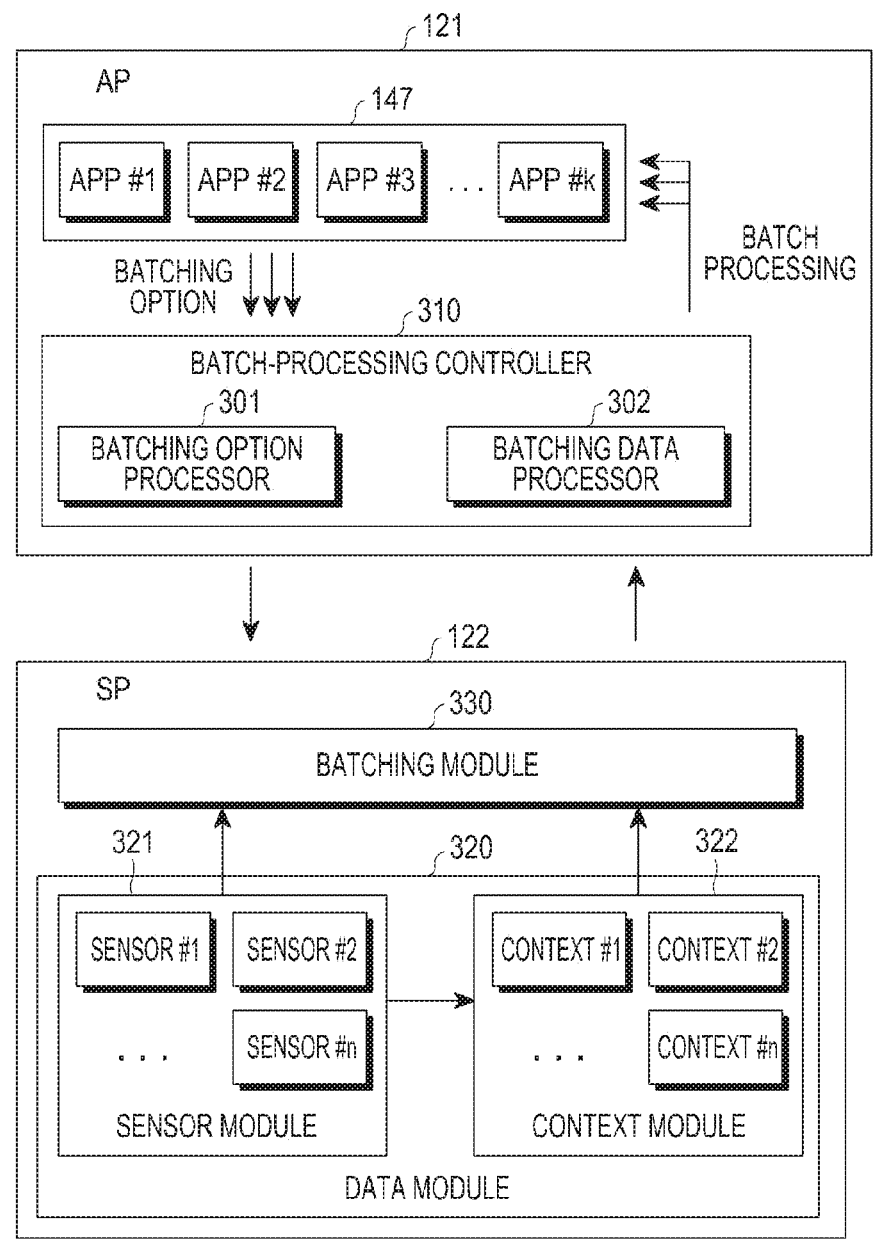
FIG. 3 is a block diagram illustrating an apparatus for batch-processing multiple data according to an embodiment of the present disclosure.

FIG. 3 is a block diagram illustrating an apparatus for batch-processing multiple data according to an embodiment of the present disclosure.

Referring to FIG. 3, the apparatus for batch-processing multiple data according to an embodiment of the present disclosure enables active selection of multiple data and batch-processing of the selected multiple data between an AP 121 and an SP 122, which may be included in a processor. The apparatus includes a batch-processing controller 310 included in the AP 121, and a data module 320 and a batching module 330 included in the SP 122.

The AP 121 also includes at least one application 147.

The applications 147 may include at least one application, or a plurality of applications App#1, App#2, App#3, and App#k. These applications 147 may provide functions related to health care (e.g., measuring an amount of exercise, a blood sugar level of a user, calories consumed or burned by the user, etc.), provisioning of environment information (e.g., provisioning of atmospheric pressure, humidity, or temperature information), or state recognition (e.g., location tracking, provisioning of information about an action state, etc.). The applications 147 may need data acquired from at least one sensor in order to execute the above functions. The applications 147 may also receive at least one data by batch processing and transmit, to the batch-processing controller 310, batching option information indicating at least one of a data type and a data arrangement scheme, required for the batch processing for the applications 147.

The batching option information includes information about data required by the application 147 for batch-processing. The batching option information may indicate at least one of the type of data to be batch-processed and a data arrangement scheme.

For example, the batching option information may indicate, as a data type, sensing data collected from at least one sensor, required for an operation of the at least one application 147 or context data obtained using the sensing data. The sensing data or the context data may be acquired by the SP 122. The context data may be obtained using at least one sensing data acquired from a sensor and may include information about a distance, a speed, an altitude, calories, the number of gaits, state recognition, or the like. For example, context data about recognition of a state of a user may be data about a user's action state determined by comparing sensing data acquired from an accelerometer, a gyro sensor, a magnetic sensor, or the like with the waveform of a pattern characteristic of each predetermined action state. In other words, the context data may be information indicating the user's action state such as sitting, standing, being stationary, walking, running, biking, driving, or the like based on the period, strength, vibration, etc. of the waveform of the sensing data acquired from the sensor. The context data may include information obtained by simple computation of sensing data (an atmospheric pressure value) acquired from an atmospheric pressure sensor, such as altitude information that may not be acquired just from raw sensing data. The information about a data arrangement scheme indicates how to arrange sensing data collected from at least one sensor in order to configure batching data. The information about a data arrangement scheme may indicate at least one of a scheme of arranging at least one data chronologically and a scheme of arranging at least one data by type. For example, data are arranged sequentially, starting from the first sensing data acquired from at least one sensor in a time-ordered data arrangement scheme. In the data type-based arrangement scheme, sensing data acquired from a sensor selected from among one or more sensors are arranged according to the type of each sensing data.

The batch-processing controller 310 includes a batching option processor 301 and a batching data processor 302.

The batching option processor 301 of the batch-processing controller 310 determines batching data configuration information according to batching option information selected by the at least one application 147 and transmits the determined batching data configuration information to the batching module 330 of the SP 122.

The batching data configuration information includes information about batching data that may be configured by the SP 122. The batching data configuration information may include information about at least one of the data types and data arrangement schemes indicated by the batching option information selected by the at least one application 147.

For example, if each piece of batching option information indicates a different data arrangement scheme, the batching data configuration information may include at least one representative data arrangement scheme. For example, the batching data configuration information may determine a representative data arrangement scheme according to the priority level of the at least one application 147. The at least one application 147 may be prioritized according to at least one of an operation time (e.g., a length of time that an application has been operating in the electronic device) and number of uses of the at least one application 147. Alternatively, a representative batching data arrangement scheme may be determined based on the priority level of the at least one piece of batching option information. The priority level of the at least one piece of batching option information may be determined according to the number of data types indicated by the batching option information.

The batching data processor 302 of the batch-processing controller 310 may batch-process batching data received from the batching module 330 of the SP 122 according to the batching option information, for the at least one application 147.

The batching data processor 302 may rearrange the batching data received from the batching module 330 according to the batching option information received from the at least one application 147 and provide the rearranged data to each of the at least one application 147. For example, the batching data processor 302 may rearrange the received batching data according to a data arrangement scheme and a data type indicated by at least one piece of batching option information. The batching data processor 302 may provide data corresponding to each piece of batching option information to a corresponding application 147.

The SP 122 includes the data module 320 and the batching module 330.

The data module 320 includes a sensor module 321 and a context module 322.

The sensor module 321 of the data module 320 includes at least one sensor, Sensor#1, Sensor#2, and Sensor#n. These sensors Sensor#1, Sensor#2, and Sensor#n may include, for example, a gesture sensor, a gyro sensor, an atmospheric pressure sensor, a magnetic sensor, an accelerometer, a grip sensor, a proximity sensor, a color sensor (for example, a red, green, blue (RGB) sensor), a biometric sensor, a temperature/humidity sensor, an illumination sensor, an ultra violet (UV) sensor, an E-nose sensor, an electromyography (EMG) sensor, an electroencephalogram (EEG) sensor, an electrocardiogram (ECG) sensor, an infrared (IR) sensor, an iris sensor, and/or a finger print sensor. The sensor module 321 may activate only sensors needed to acquire sensing data from among the at least one sensor, Sensor#1, Sensor#2, and Sensor#n based on the batching data configuration information received from the batch-processing controller 310, acquire sensing data from the activated sensors, and store the acquired sensing data.

The context module 322 of the data module 320 may include at least one context computation module for obtaining at least one context data, Context#1, Context#2, and Context#n. These context computation modules Context#1, Context#2, and Context#n may calculate information about a distance, a speed, an altitude, the number of gaits, state recognition, and the like using at least one sensing data acquired from the sensor module 321. For example, a context computation module for obtaining context data about recognition of a user state may acquire the context data about the user state by comparing sensing data acquired from an accelerometer, a gyro sensor, a magnetic sensor, or the like with the waveform of a pattern characteristic of each predetermined action state. In other words, the context data may include information indicating the user's action state such as sitting, standing, being stationary, walking, running, biking, driving, or the like based on the period, strength, vibration, or the like of the waveform of the sensing data acquired from the sensor. The context data may be information obtained by simple computation of sensing data (e.g., an atmospheric pressure value) acquired from an atmospheric pressure sensor, such as altitude information, which may not be acquired just from raw sensing data. The context module 322 may activate only a context computation module required to acquire context data from among the at least one context computation module Context#1, Context#2, and Context#n based on the batching data configuration information received from the batch-processing controller 310, acquire context data from the activated context computation module, and store the acquired context data.

The batching module 330 may receive the batching data configuration information from the batching option processor 301, and transmit the received batching data configuration information to the data module 320, so that the data module 320 may selectively acquire data based on the batching data configuration information. Then, the batching module 330 may configure batching data including at least one data acquired by the data module 320 and transmit the configured batching data to the batching data processor 302.

If a predetermined batch-processing condition is satisfied, the batching module 330 configures data stored in the data module 320 and transmits the configured batching data to the batching data processor 302.

The predetermined batch-processing condition may include at least one of a predetermined batch-processing period, reaching a threshold memory capacity, reception of a batch-processing request signal, an inter-processor transmission capacity, and an inter-processor transmission speed.

The batching module 330 may configure batching data by arranging data stored in the data module 320 in the data arrangement scheme indicated by the batching data configuration information. For example, the batching data may be configured by arranging the data in the data arrangement scheme indicated by the batching data configuration information in the batching data configuration procedure. Alternatively, the data may be arranged and stored in the data arrangement scheme indicated by the batching data configuration information during storing the data acquired from the data module 320, and the batching module 330 may transmit the data stored in the data module 320 as batching data to the batching data processor 302 without any additional process for configuring the batching data.

Figure 4:
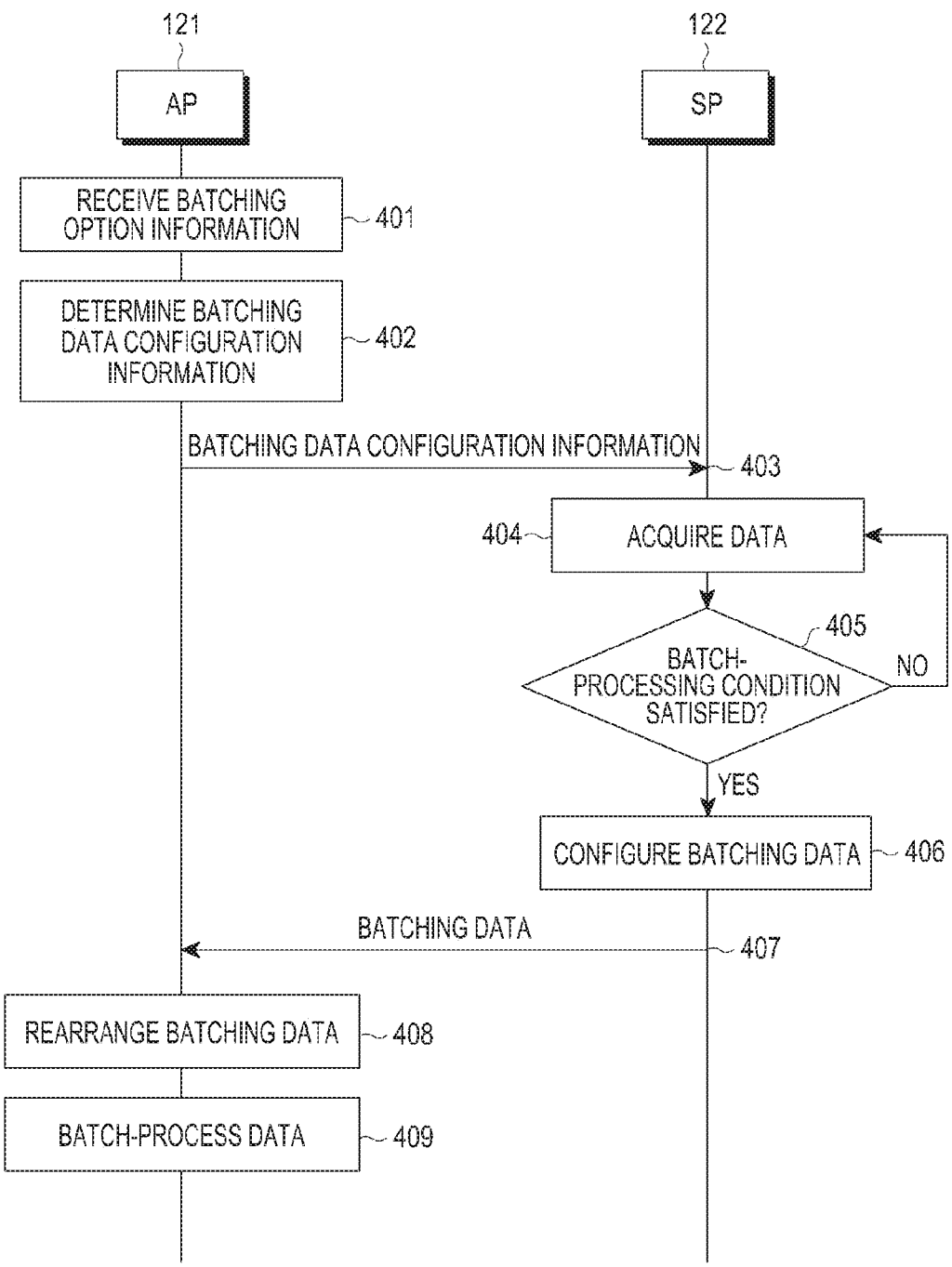
FIG. 4 is a diagram illustrating a signal flow for a procedure for batch-processing multiple data according to an embodiment of the present disclosure.

FIG. 4 is a diagram illustrating a signal flow for a method for batch-processing multiple data according to an embodiment of the present disclosure.

Referring to FIG. 4, in step 401, the AP 121 receives batching option information from at least one application 147. The batching option information may indicate a data type which is sensing data or context data. The sensing data is collected from at least one sensor required for an operation of the at least one application, and the context data is calculated using the sensing data.

In step 402, the AP 121 determines batching data configuration information based on the received batching option information. The batching data configuration information includes information about batching data configurable by means of the SP 122. The batching data configuration information may include information about at least one data type and data arrangement scheme indicated by each piece of batching option information received from the at least one application 147.

For example, if each piece of batching option information indicates a different data arrangement scheme, at least one representative data arrangement scheme may be determined and included in the batching data configuration information. For example, the at least one application may be prioritized and a representative data arrangement scheme may be determined based on the priority level of the at least one application. The priority level of an application 147 may be determined using at least one of an operation time and the number of uses. In another example, the at least one piece of batching option information may be prioritized and a representative data arrangement scheme may be determined based on the priority level of the at least one piece of batching option information. The priority level of batching option information may be determined using the number of data types indicated by the batching option information.

In step 403, the AP 121 transmits the determined batching data configuration information to the SP 122. As the AP 121 transmits the batching data configuration information to the SP 122, the AP 121 may request the SP 122 to batch-process batching data including at least one acquired data based on the batching data configuration information.

In step 404, the SP 122 selectively acquires data based on the received batching data configuration information. The SP 122 may check a data type indicated by the batching data configuration information received from the AP 121 and selectively acquire only data of the checked data type. For example, the SP 122 may activate only a sensor used to acquire sensing data from among one or more sensors included in the electronic device 101, based on the batching data configuration information, acquire sensing data from the activated sensor, and store the acquired sensing data. If the data type is context data, the SP 122 may perform a computation operation to obtain context data, calculate the context data using sensing data needed to acquire the context data, and store the calculated context data.

In step 405, the SP 122 determines whether a predetermined batch-processing condition is satisfied, during storage of the acquired data. The predetermined batch-processing condition may include at least one of a predetermined batch-processing period, reaching a threshold memory capacity of the SP 122, reception of a batch-processing request signal from the AP 121, an inter-processor transmission capacity, and an inter-processor transmission speed. If the predetermined batch-processing condition is not satisfied, the SP 122 continues acquiring data in step 404.

However, if the predetermined batch-processing condition is satisfied, the SP 122 configures batching data with the stored data in step 406. The batching data may be configured by arranging the stored data in a data arrangement scheme indicated by the batching data configuration information. For example, the acquired data may be arranged in the data arrangement scheme indicated by the batching data configuration information, and then stored during a storage operation. Alternatively, the data may be arranged in the data arrangement scheme indicated by the batching data configuration information, and then configured into batching data during a batching data configuration operation.

In step 407, the SP 122 transmits the configured batching data to the AP 121.

In step 408, the AP 121 rearranges the received batching data according to the batching option information. The AP 121 rearranges the received batching data according to a data arrangement scheme and a data type indicated by at least one piece of batching option information.

In step 409, the AP 121 provides the rearranged data to the respective applications. The applications may provide functions using the data received from the AP 121, such as functions related to health care (e.g., measuring the amount of exercise, a blood sugar level, calories, etc.), provisioning of environment information (e.g., provisioning of atmospheric pressure, humidity, or temperature information, etc.), or state recognition (e.g., location tracking, provisioning of information about an action state, etc.).

Figure 5:
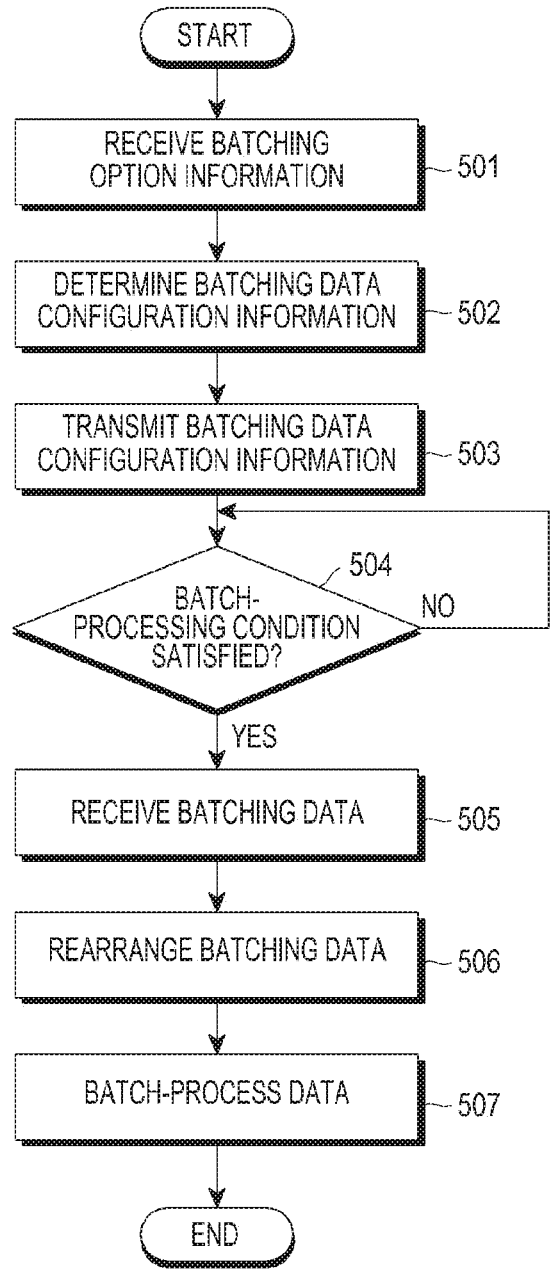
FIG. 5 is a flowchart illustrating an operation for batch-processing multiple data, performed by an application processor (AP), according to an embodiment of the present disclosure.
Figure 6:
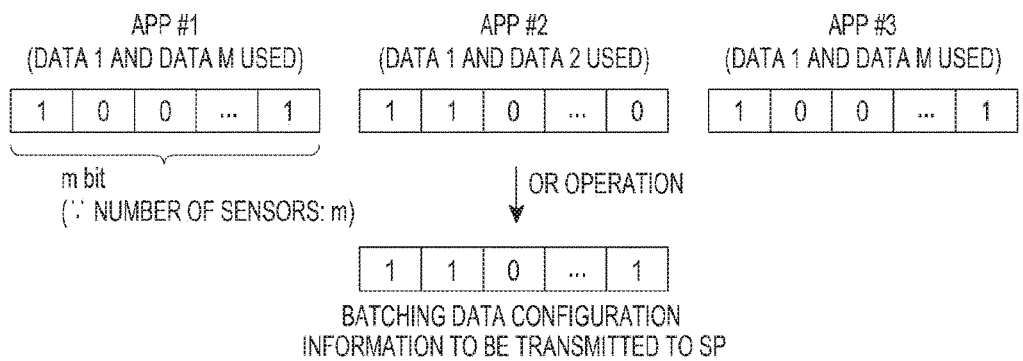
FIG. 6 is a diagram illustrating a method for configuring batching data configuration information according to an embodiment of the present disclosure.
Figure 7:
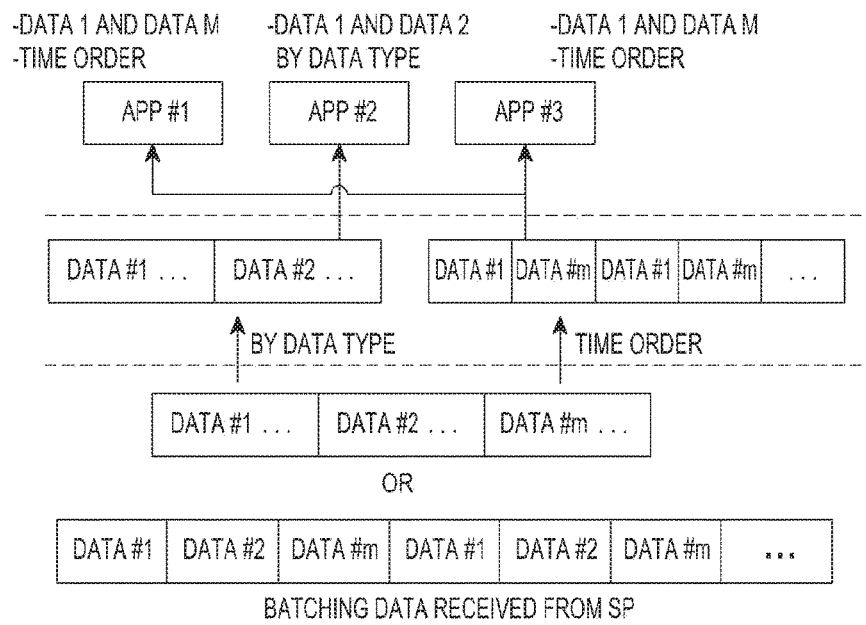
FIG. 7 is a diagram illustrating a method for batch-processing batching data according to an embodiment of the present disclosure.

FIG. 5 is a flowchart illustrating a method for batch-processing multiple data, performed by an AP, according to an embodiment of the present disclosure. FIG. 6 is a diagram illustrating a method for configuring batching data configuration information according to an embodiment of the present disclosure. FIG. 7 is a diagram illustrating a method for batch-processing batching data according to an embodiment of the present disclosure.

With reference to FIGS. 5, 6, and 7, an operation for batch-processing multiple data in an AP according to an embodiment of the present disclosure will be described below in detail.

In step 501, the AP 121 receives batching option information from at least one application 147. The batching option information may indicate a data type, such as sensing data or context data. The sensing data is collected from at least one sensor required for an operation of the at least one application, and the context data is calculated using the sensing data.

In step 502, the AP 121 may determine batching data configuration information based on the received batching option information. The batching data configuration information is information about batching data configurable by means of the SP 122. The batching data configuration information may include information about at least one of every data type and every data arrangement scheme indicated by each piece of batching option information received from the at least one application 147.

For example, upon receipt of batching option information selected by three applications, App#1, App#2, and App#3, if the batching option information of App#1 indicates data 1 and data m, the batching option information of App#2 indicates data 1 and data 2, and the batching option information of App#3 indicates data 1 and data m, the AP 121 may configure batching data configuration information indicating data 1, data 2, and data m as data types.

If each piece of batching option information indicates a different data arrangement scheme, the AP 121 may determine at least one representative data arrangement scheme and include information about the at least one representative data arrangement scheme in the batching data configuration information. For example, the at least one application may be prioritized, and a representative data arrangement scheme may be determined based on the priority level of the at least one application. The priority level of an application may be determined using at least one of an operation time and the number of uses of the application. Alternatively, the at least one piece of batching option information may be prioritized and a representative data arrangement scheme may be determined based on the priority level of the at least one piece of batching option information. The priority level of batching option information may be determined using the number of data types indicated by the batching option information.

In step 503, the AP 121 transmits the determined batching data configuration information to the SP 122. As the AP 121 transmits the batching data configuration information to the SP 122, the AP 121 may request the SP 122 to batch-process batching data including at least one acquired data based on the batching data configuration information.

In step 504, the AP 121 may operate in sleep a mode or an operating mode. In the sleep mode, the AP 121 may wait without receiving batching data from the SP 122. Even in the operating mode, the AP 121 may not receive batching data from the SP 122, if the AP 121 does not reach a batch-processing period or there is no need for batch-processing data. In this state, the AP 121 may determine whether a predetermined batch-processing condition is satisfied. For example, if the AP 121 reaches the predetermined batch-processing period, an application requests batch processing, the AP 121 switches from the sleep mode to the operating mode, or the SP 121 is requested to perform batch-processing, the predetermined batch-processing condition is satisfied.

If the predetermined batch-processing condition is satisfied, the AP may receive batching data from the SP 122 in step 505.

In step 506, the AP 121 rearranges the received batching data according to the batching option information. The AP 121 may rearrange the received batching data according to a data arrangement scheme and a data type indicated by at least one piece of batching option information.

In step 507, the AP 121 provides the rearranged data to the respective applications. The applications may provide functions using the data received from the AP 121, such as functions related to health care (e.g., measuring an amount of exercise of a user, a blood sugar level of the user, calories consumed or burned by the user, et.), provisioning of environment information (e.g., provisioning of atmospheric pressure, humidity, or temperature information), or state recognition (e.g., location tracking, provisioning of information about an action state, etc/).

When the AP 121 batch-processes the received batching data for the at least one application according to the batching option information as illustrated in FIG. 7, if the AP 121 receives batching data of data types Data#1, Data#2, and Data#m arranged chronologically and batching data of data types Data#1, Data#2, and Data#m arranged by data type, the batching option information of App#1 indicates data types, data 1 and data m and the time-ordered arrangement scheme, the batching option information of App#2 indicates data types, data 1 and data 2 and the data type-based arrangement scheme, and the batching option information of App#3 indicates data types, data 1 and data m and the time-ordered arrangement scheme. Further, the AP 121 may rearrange at least one data included in the batching data to data 1 and data 2 arranged by data type and data 1 and data m arranged chronologically and provide the rearranged data corresponding to the batching option information of the applications, App#1, App#2, and App#3, to the applications, App#1, App#2, and App#3.

Figure 8:
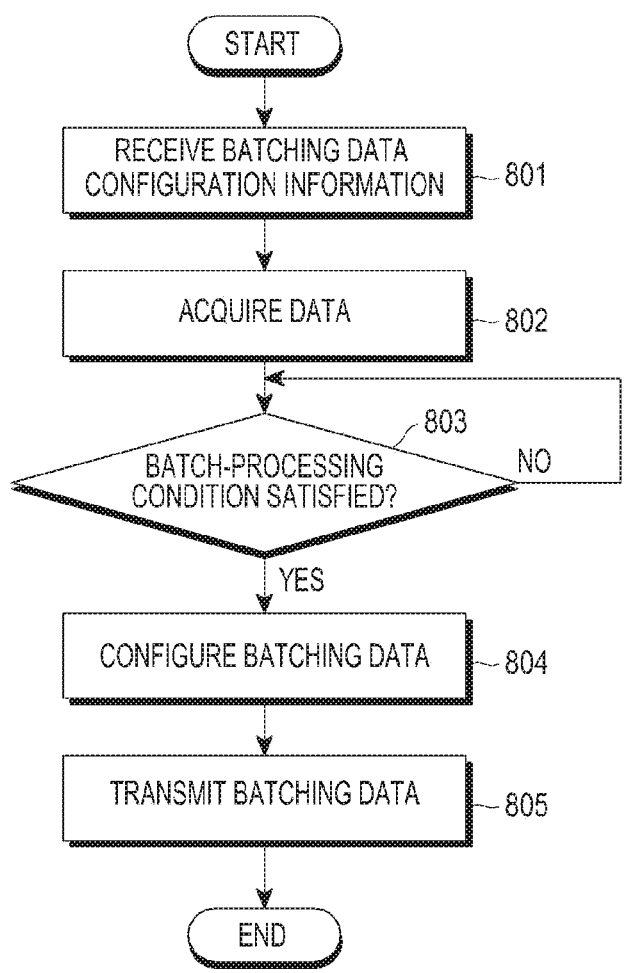
FIG. 8 is a flowchart illustrating an operation for batch-processing batching data, performed by a supplementary processor (SP), according to an embodiment of the present disclosure.
Figure 9:
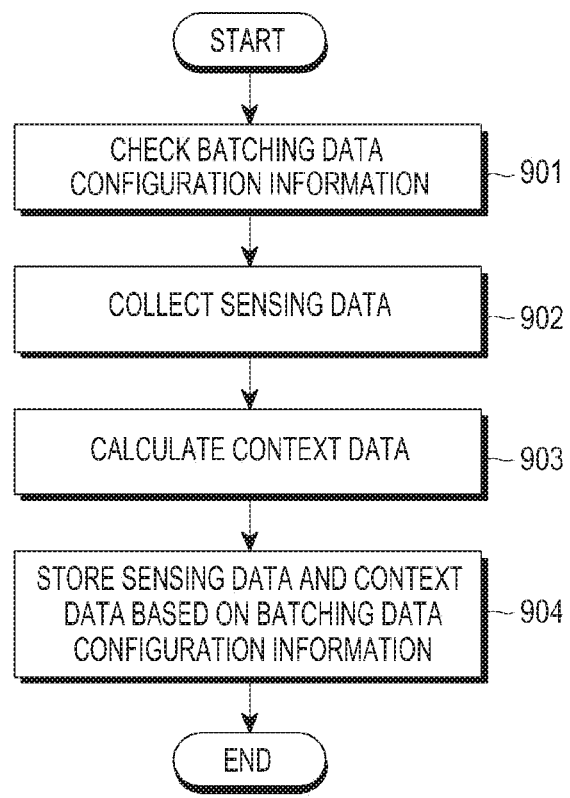
FIG. 9 is a detailed flowchart illustrating an operation for acquiring multiple data, illustrated in FIG. 8.
Figure 10:
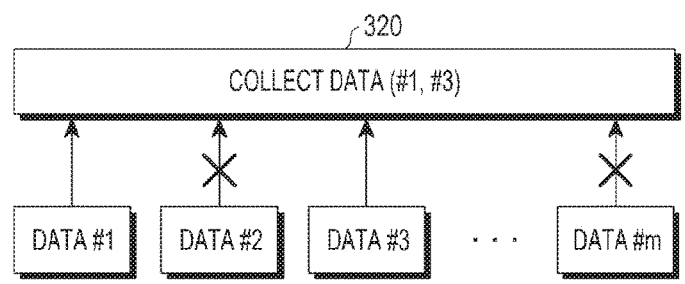
FIG. 10 is a diagram illustrating a method for acquiring multiple data according to an embodiment of the present disclosure.

FIG. 8 is a flowchart illustrating a method for batch-processing batching data, performed by an SP, according to an embodiment of the present disclosure. FIG. 9 is a detailed flowchart illustrating a method for acquiring multiple data, illustrated in FIG. 8. FIG. 10 illustrates a method for acquiring multiple data according to an embodiment of the present disclosure.

With reference to FIGS. 8, 9, and 10, a method for batch-processing multiple data in an SP according to an embodiment of the present disclosure is described as follows.

Referring to FIG. 8, in step 801, the SP 122 receives batching data configuration information from the AP 121.

In step 802, the SP 122 selectively acquires data based on the received batching data configuration information.

In step 803, the SP 122 determines whether a predetermined batch-processing condition is satisfied during storage of the data. The predetermined batch-processing condition may include at least one of elapse of a predetermined batch-processing period, reaching a threshold memory capacity of the SP 122, reception of a batch-processing request signal from the AP 121, reaching an inter-processor transmission capacity, and attaining a predetermined inter-processor transmission speed.

If the predetermined batch-processing condition is satisfied, the SP 122 configures batching data with the stored data in step 804. The batching data may be configured by arranging the stored data in a data arrangement scheme indicated by the batching data configuration information. For example, the acquired data may be arranged in the data arrangement scheme indicated by the batching data configuration information and then stored during a storing operation. Alternatively, the data may be arranged in the data arrangement scheme indicated by the batching data configuration information and then configured into batching data during a batching data configuration operation.

In step 805, the SP 122 transmits the configured batching data to the AP 121.

Step 802, in which data is selectively acquired based on the batching data configuration information is described in greater detail as follows with reference to FIG. 9. As illustrated in FIG. 9, the SP 122 checks the batching data configuration information, in step 901.

In step 902, the SP 122 selectively acquires only data of a data type indicated by the batching data configuration information. The SP may activate only a sensor used to acquire sensing data from among one or more sensors, based on the batching data configuration information, and acquire sensing data from the activated sensor.

For example, if data types indicated by the batching data configuration information are Data#1 and Data#3, the SP 122 may selectively acquire only Data#1 and Data#3 from among at least one data Data#1, Data#2, Data#3, and Data#m into collected data 320, as illustrated in FIG. 10.

In step 903, the SP performs a computation operation to obtain context data indicated by the batching data configuration information, and calculates the context data using sensing data needed to acquire the context data.

In step 904, the SP 122 stores the sensing data acquired in step 902 and the context data acquired in step 903. The SP 122 may store the sensing data and the context data according to a data arrangement scheme indicated by the batching data configuration information. For example, the sensing data acquired from at least one sensor and the calculated context data may be arranged and stored sequentially, starting from the first generated data in the time-ordered arrangement scheme. In the data type-based arrangement scheme, the sensing data acquired from at least one sensor and the calculated context data may be arranged by data type.

Figure 11:
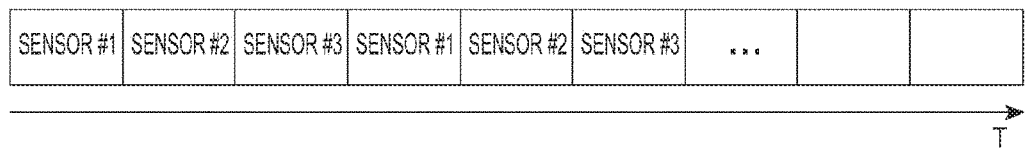
FIG. 11 is a diagram illustrating batching data arranged chronologically according to an embodiment of the present disclosure.
Figure 12:
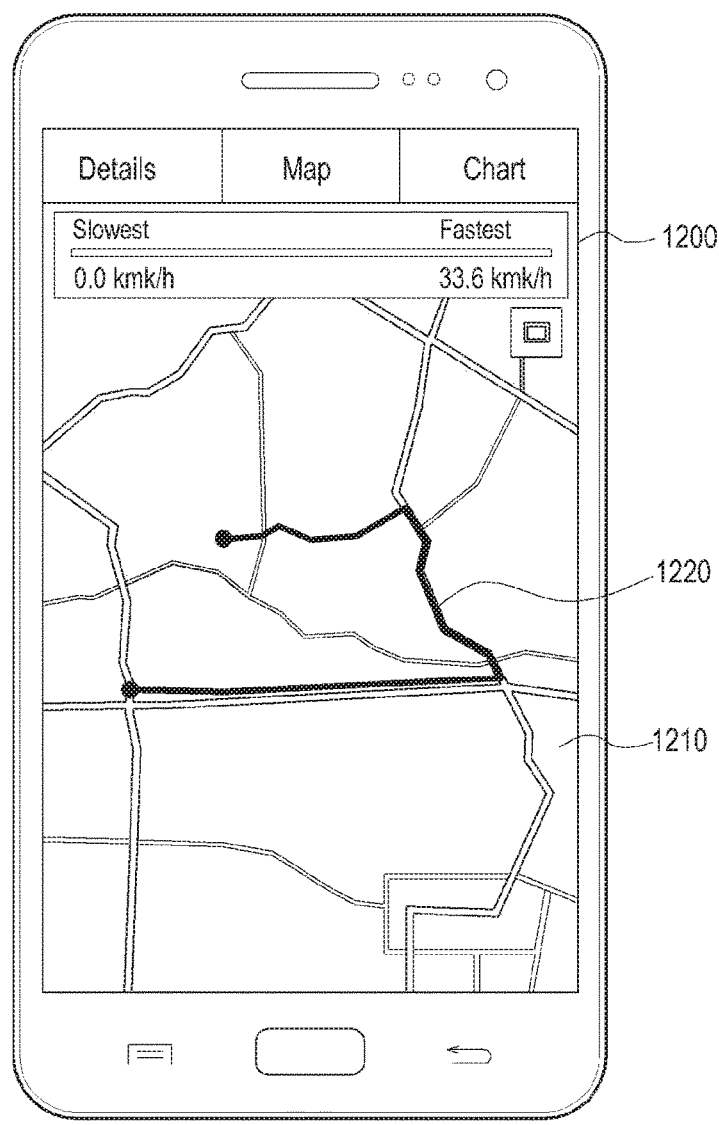
FIG. 12 is a diagram illustrating an execution screen of an application to which batching data arranged chronologically are applied according to an embodiment of the present disclosure.

FIG. 11 is a diagram illustrating an example of batching data arranged chronologically according to an embodiment of the present disclosure. FIG. 12 is a diagram illustrating an example of an execution screen of an application to which batching data arranged chronologically are applied according to the embodiment of FIG. 11.

Time-ordered batching data may be configured by sequentially arranging sensing data acquired from at least one sensor, starting from the first acquired sensing data, as illustrated in FIG. 11. Time-ordered batching data may be batch-processed for an application requiring sensing data that vary in real time.

Referring to FIG. 12, for example, an application 1200 for providing a three-dimensional (3D) location trace of a user's movement (e.g., walking, running, biking, etc.) may specify the user's two-dimensional (2D) positions using GPS data and specify the altitude of the user based on atmospheric pressure data, thereby finally specifying the 3D position and movement distance of the user. In this case, batching data to be batch-processed must be arranged chronologically for the application 1200. As the time-ordered batching data is batch-processed for the application 1200, the application 1200 may display a movement trace 1220 of the use on a map 1210 using time-ordered GPS data, without rearrangement, such as additional time-ordered arrangement of the GPS data. Further, an exercise amount such as an exercise distance, an exercise time, and calories consumed for exercise may be displayed over time using time-ordered context data, such as a distance change, a time change, etc. Also, information about the current user's action state may be provided using time-ordered context data used to recognize the user's action state.

Figure 13:
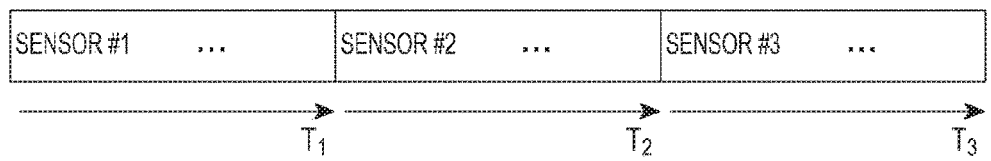
FIG. 13 is a diagram illustrating batching data arranged by data according to another embodiment of the present disclosure.
Figure 14:
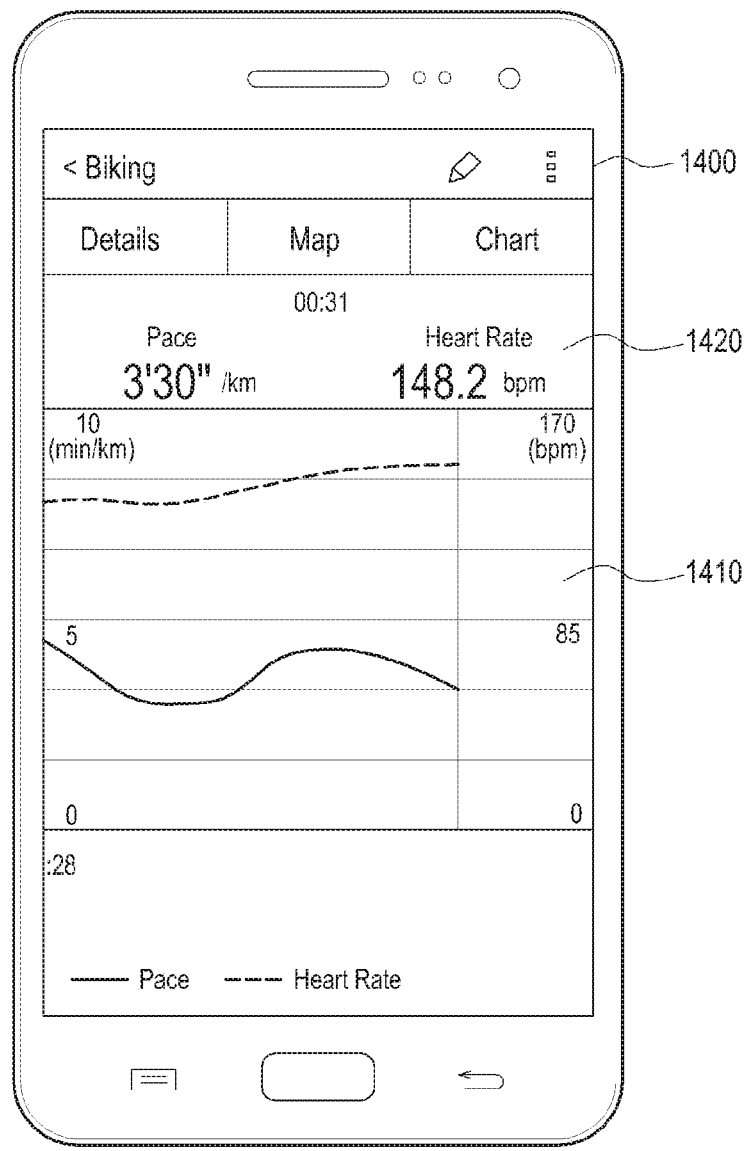
FIG. 14 is a diagram illustrating an execution screen of an application to which batching data arranged by data are applied according to another embodiment of the present disclosure.

FIG. 13 is a diagram illustrating batching data arranged by data according to another embodiment of the present disclosure. FIG. 14 is a diagram illustrating an example of an execution screen of an application to which batching data arranged by data are applied according to the embodiment of FIG. 13.

Referring to FIG. 13, data type-based arranged batching may be configured by arranging sensing data acquired from at least one sensor by data type. Data type-based arranged batching data are batch-processed for an application requiring sensing data accumulated per data type.

As illustrated in FIG. 14, batching data, in which only context data related to speed data or data about the user's heart rate, are batch-processed, for example, for an application 1400, which provides a pace or the user's heart rate from the user's exercise as a graph or numerical values. Thus, the application 1400 directly displays a pace and the user's heart rate from the user's exercise as a graph 1410 and numerical values 1420 without rearrangement, such as additional arrangement of the context data. Further, the application 1400 displays comprehensive information about an exercise performed for a predetermined time, such as an average pace, an average speed, and a peak speed. If a location is measured using an accelerometer or an angular speed sensor in an indoor location, in which it may not be possible to receive GPS data, a distance may be calculated using acceleration data for a predetermined time and a direction may be determined by filtering angular speed data. In this case, data type-based arranged batching data may also be required.

Figure 15:
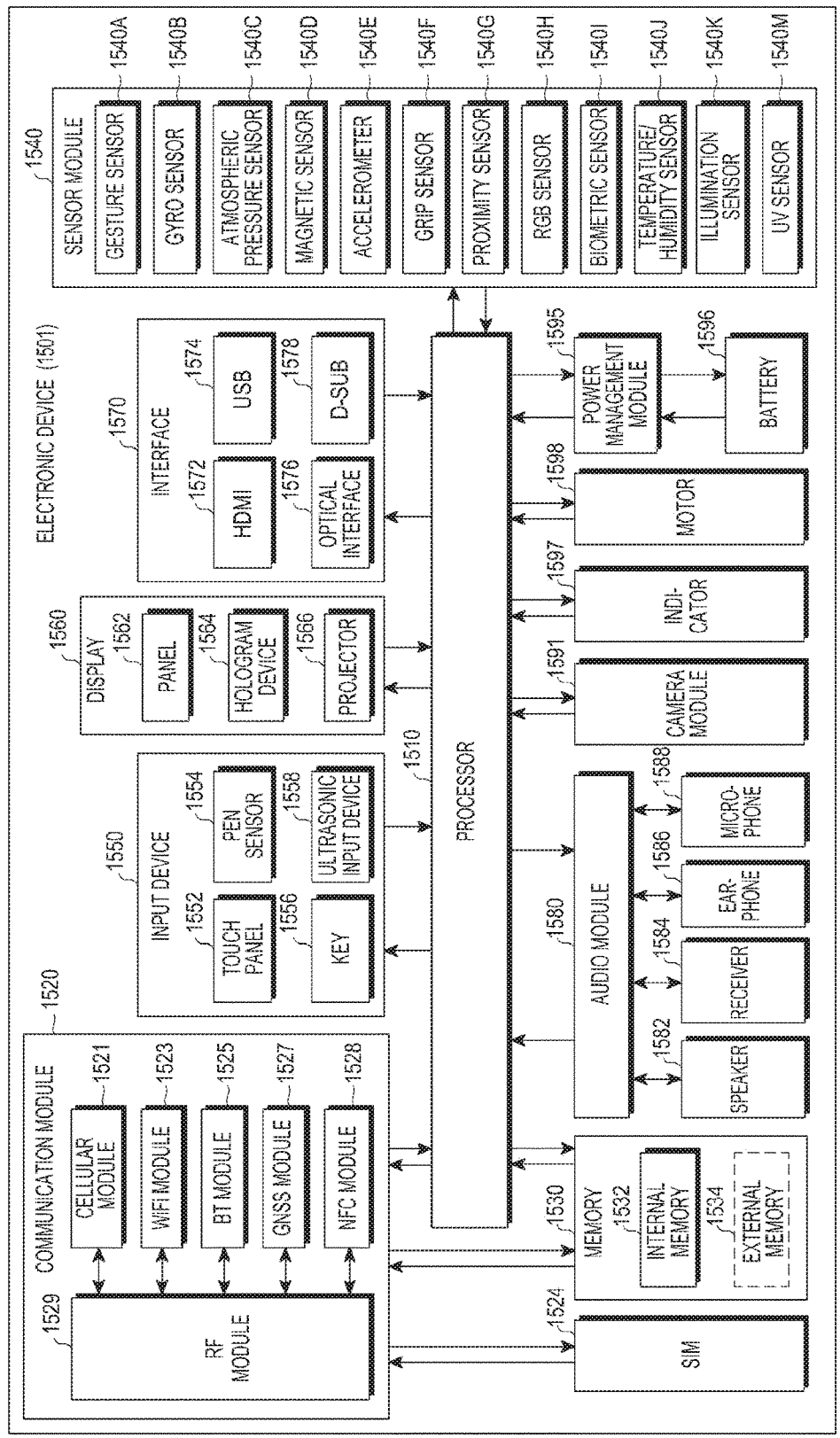
FIG. 15 is a block diagram illustrating an electronic device according to various embodiments of the present disclosure.

FIG. 15 is a block diagram illustrating an electronic device according to an embodiment of the present disclosure.

Referring to FIG. 15, the electronic device 1501 includes, for example, one or more APs 1510, a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may, for example, control one or more hardware or software components that are connected to the processor 1510 by executing an OS or an application program and may perform processing or computation of various types of data. The processor 1510 may be implemented, for example, as a system on chip (SoC). The processor 1510 may further include a graphics processing unit (GPU) and/or an image signal processor. The processor 1510 may include at least a part of the other components illustrated in FIG. 15, such as the cellular module 1521. The processor 1510 may load a command or data received from at least one of other components (e.g., a non-volatile memory), process the loaded command or data, and store various types of data in the non-volatile memory.

The communication module 1520 may have the same or a similar configuration as a configuration of the communication interface 170 illustrated in FIG. 1. The communication module 1520 includes, for example, the cellular module 1521, a WiFi module 1523, a Bluetooth (BT) module 1525, a GNSS module 1527, a near-field communication (NFC) module 1528, and a radio frequency (RF) module 1529.

The cellular module 1521 may provide services such as voice call, video call, SMS, or the Internet through a communication network. The cellular module 1521 may identify and authenticate the electronic device 1501 within a communication network, using a SIM card 1524. The cellular module 1521 may also perform at least a part of the functionalities of the processor 1510. The cellular module 1521 may also include a CP.

Each of the WiFi module 1523, the BT module 1525, the GNSS module 1527, and the NFC module 1528 may include, for example, a processor that may process data received or transmitted by the respective modules. At least some (e.g., two or more) of the cellular module 1521, the WiFi module 1523, the BT module 1525, the GNSS module 1527, or the NFC module 1528 may be included in an integrated chip (IC) or an IC package.

The RF module 1529 may transmit and receive communication signals (e.g., RF signals). The RF module 1529 may include, for example, a transceiver, a power amplifier module (PAM), a frequency filter, a low noise amplifier (LNA), an antenna, etc. At least one of the cellular module 1521, the WiFi module 1523, the BT module 1525, the GNSS module 1527, or the NFC module 1528 may transmit and receive RF signals via a separate RF module.

The SIM 1524 may include, for example, a card including a SIM and/or an embedded SIM. The SIM 1524 may include a unique identifier (e.g., integrated circuit card identifier (ICCID)) or subscriber information (e.g., international mobile subscriber identity (IMSI)).

The memory 1530 may include, for example, an internal memory 1532 or an external memory 1534. The internal memory 1532 may include at least one of, for example, a volatile memory (for example, dynamic RAM (DRAM), static RAM (SRAM), or synchronous dynamic RAM (SDRAM)), a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, or NOR flash memory), a hard driver, or a solid state driver (SSD).

The external memory 1534 may further include, for example, a flash drive such as a compact flash (CF) drive, a secure digital (SD), a micro secure digital (micro-SD), a mini secure digital (mini-SD), an extreme digital (xD), or a memory stick. The external memory 1534 may be operatively and/or physically coupled to the electronic device 1501 via various interfaces.

The sensor module 1540 may, for example, measure physical quantities or detect operational states associated with the electronic device 1501, and convert the measured or detected information into electric signals. The sensor module 1540 includes, for example, a gesture sensor 1540A, a gyro sensor 1540B, an atmospheric pressure sensor 1540C, a magnetic sensor 1540D, an accelerometer 1540E, a grip sensor 1540F, a proximity sensor 1540G, a color sensor (e.g., an RGB sensor) 1540H, a biometric sensor 15401, a temperature/humidity sensor 1540J, an illumination sensor 1540K, or a UV sensor 1540M. Additionally or alternatively, the sensor module 1540 may include, for example, an electrical-nose (E-nose) sensor, an electromyography (EMG) sensor, an EEG electroencephalogram (EEG) sensor, an electrocardiogram (ECG) sensor, an infrared (IR) sensor, an iris sensor, and/or a finger print sensor. The sensor module 1540 may further include a control circuit for controlling one or more sensors included therein. The electronic device 1501 may further include a processor configured to control the sensor module 1540, as a part of or separately from the processor 1510. Thus, while the AP 1510 is in a sleep state, the control circuit may control the sensor module 1540.

The input device 1550 includes, for example, a touch panel 1552, a (digital) pen sensor 1554, a key 1556, and an ultrasonic input device 1558. The touch panel 1552 may operate in at least one of, for example, capacitive, resistive, infrared, and ultrasonic methods. The touch panel 1552 may further include a control circuit. The touch panel 1552 may further include a tactile layer to thereby provide haptic feedback to the user.

The (digital) pen sensor 1554 may include, for example, a detection sheet which is a part of the touch panel or separately configured from the touch panel. The key 1556 may include, for example, a physical button, an optical key, or a keypad. The ultrasonic input device 1558 may be configured to identify data by detecting, using a microphone 1588, ultrasonic signals generated by an input tool capable of generating the ultrasonic signal.

The display 1560 includes, for example, a panel 1562, a hologram device 1564, and a projector 1566. The panel 1562 may have the same or a similar configuration as a configuration of the display 160 of FIG. 1. The panel 1562 may be configured to be, for example, flexible, transparent, or wearable. The panel 1562 and the touch panel 1552 may be implemented as a single module. The hologram device 1564 may utilize the interference of light waves to provide a 3D image in empty space. The projector 1566 may provide an image by projecting light on a screen. The screen may be positioned, for example, inside or outside the electronic device 1501. The display 1560 may further include a control circuit for controlling the panel 1562, the hologram device 1564, or the projector 1566.

The interface 1570 includes, for example, a high-definition multimedia interface (HDMI) 1572, a USB 1574, an optical interface 1576, and a D-subminiature (D-sub) 1578. The interface 1570 may be included, for example, in the communication interface 170 of FIG. 1. Additionally or alternatively, the interface 1570 may include, for example, a mobile high-definition link (MHL) interface, an SD/Multimedia Card interface, or an infrared data association (IrDA) interface.

The audio module 1580 may encode/decode a voice into an electrical signal, and vice versa. At least a part of the components of the audio module 1580 may be included, for example, in the I/O interface 150 illustrated in FIG. 1. The audio module 1580 may process audio information input into, or output from, for example, a speaker 1582, a receiver 1584, an earphone 1586, or the microphone 1588.

The camera module 1591 may capture, for example, still images or a video. The camera module 1591 may include one or more image sensors (e.g., a front sensor or a rear sensor), a lens, an image signal processor (ISP), or a flash (for example, an LED or a xenon lamp).

The power management module 1595 may manage power of the electronic device 1501. The power management module 1595 may include a power management integrated circuit (PMIC), a charger IC, or a battery gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery gauge may measure, for example, a charge level, a voltage while charging, current, or temperature of the battery 1596. The battery 1596 may include, for example, a rechargeable battery and/or a solar battery.

The indicator 1597 may indicate one or more states (for example, boot status, message status, or charge status) of the electronic device 1501 or a part of the electronic device 1501, such as the processor 1510. The motor 1598 may convert an electrical signal into a mechanical vibration and generate vibrations or a haptic effect. The electronic device 1501 may include a device for supporting mobile TV (for example, a GPU). The device for supporting mobile TV may process media data compliant with, for example, digital multimedia broadcasting (DMB), digital video broadcasting (DVB), or MediaFlO™.

As is apparent from the foregoing description, a method and apparatus for batch-processing multiple data are provided. Thus, since sensor data collected continuously through a low-power processor interacting with at least one sensor are batch-processed for a main processor, power consumption can be minimized, the main processor can actively select multiple batching data to be batch-processed at the low-power processor, and the batch-processed multiple batching data can be provided in a form optimized for each application. Accordingly, multiple data can be batch-processed effectively. Further, due to effective batching of multiple data, unnecessary memory consumption or data transmission can be reduced and unnecessary processes for rearranging multiple batching data separately in each application can be reduced. Therefore, the processing speed of a processor can be increased.

Each of the above-described components of the electronic device described may include one or more components, and each component's name may vary according to the type of the electronic device. An electronic device according to an embodiment of the present disclosure may include at least one of the above-described components, some components may be omitted, and additional components may be included. Some of the components may be combined into a single entity and perform functions identical to those of the respective components before their combination.

While the disclosure has been shown and described with reference to certain embodiments thereof, it will be understood by those skilled in the art that various changes in form and details may be made therein without departing from the spirit and scope of the disclosure as defined by the following claims and their equivalents.

What is claimed is:

1. A method for batch-processing multiple data in a first processor of an electronic device, the method comprising:
    transmitting batching data configuration information to a second processor of the electronic device according to batching option information of at least one application;
    receiving, from the second processor, batching data including at least one data acquired via at least one sensor of the electronic device based on the batching data configuration information, wherein the batching data is generated according to whether a predetermined batch-processing condition is satisfied, and wherein the predetermined batch-processing condition includes a memory capacity of the second processor, a transmission capacity between the first processor and the second processor, and a transmission speed between the first processor and the second processor; and
    batch-processing the received batching data according to the batching option information, for the at least one application, wherein the batching option information includes information indicating at least a data arrangement scheme required for batch-processing for the at least one application and determined according to one of a priority level of the at least one application and a priority level of the batching option information.

2. The method of claim 1, wherein the batching option information includes information indicating a data type required for batch-processing for the at least one application.

3. The method of claim 2, wherein the data type is one of sensing data and context data, the sensing data being collected from the at least one sensor by the second processor and the context data being calculated using the sensing data by the second processor.

4. The method of claim 2, wherein the data arrangement scheme is at least one of a first scheme for arranging the at least one data received from the second processor chronologically and a second scheme for arranging the at least one data by the data type.

5. The method of claim 1, wherein the batching data configuration information includes information about all data types indicated by the batching option information.

6. The method of claim 1, wherein the batching data configuration information is determined according to the priority level of the at least one application.

7. The method of claim 6, wherein the priority level of the at least one application is determined according to at least one of an operation time and the number of uses of each of the at least one application.

8. The method of claim 1, wherein the batching data configuration information is determined according to the priority level of the batching option information.

9. The method of claim 8, wherein the priority level of the batching option information is determined according to the number of data types indicated by the batching option information.

10. The method of claim 1, wherein batch-processing the batching data comprises rearranging the batching data according to the batching option information and providing the rearranged batching data to the at least one application.

11. The method of claim 1, wherein the batching data is selectively acquired based on the batching data configuration information.

12. The method of claim 11, wherein the selectively acquired batching data includes sensing data collected from the at least one sensor based on the batching data configuration information and context data calculated using the sensing data.

13. A first processor of an electronic device for batch-processing multiple data between the first processor and a second processor of the electronic device, the first processor comprising:
a memory for storing at least a part of at least one application for execution by the first processor; and
a batch-processing controller configured to control transmission of batching data configuration information to the second processor according to batching option information of the at least one application, reception of batching data including at least one data acquired via at least one sensor of the electronic device based on the batching data configuration information from the second processor, and batch-processing of the received batching data according to the batching option information, for the at least one application,
wherein the batching option information includes information indicating at least a data arrangement scheme required for batch-processing for the at least one application and determined according to one of a priority level of the at least one application and a priority level of the batching option information, and
wherein the batching data is generated according to whether a predetermined batch-processing condition is satisfied, and wherein the predetermined batch-processing condition includes a memory capacity of the second processor, a transmission capacity between the first processor and the second processor, and a transmission speed between the first processor and the second processor.

14. The first processor of claim 13, wherein the batching option information includes information indicating a data type required for batch-processing for the at least one application.

15. The first processor of claim 14, wherein the data type is one of sensing data and context data, the sensing data being collected from the at least one sensor by the second processor and the context data being calculated using the sensing data by the second processor.

16. The first processor of claim 14, wherein the data arrangement scheme is at least one of a first scheme for arranging the at least one data received from the second processor chronologically and a second scheme for arranging the at least one data by the data type.

17. The first processor of claim 13, wherein the batching data configuration information includes information about all data types indicated by the batching option information.

18. The first processor of claim 13, wherein the batching data configuration information is determined according to the priority level of the at least one application.

19. The first processor of claim 18, wherein the batch-processing controller determines the priority level of the at least one application according to at least one of an operation time and the number of uses of each of the at least one application.

20. The first processor of claim 13, wherein the batching data configuration information is determined according to the priority level of the batching option information.

21. The first processor of claim 20, wherein the batch-processing controller determines the priority level of the batching option information according to the number of data types indicated by the batching option information.

22. The first processor of claim 13, wherein the batch-processing controller rearranges the batching data according to the batching option information and provides the rearranged batching data to the at least one application.

23. A second processor of an electronic device for batch-processing multiple data between a first processor of the electronic device and the second processor, the second processor comprising:
a data module configured to store data acquired from at least one sensor; and
a controller configured to control reception of batching data configuration information according to batching option information of at least one application from the first processor and to control transmission of batching data including at least one data acquired by the data module via the at least one sensor of the electronic device to the first processor,
wherein the batching option information includes information indicating at least a data arrangement scheme required for batch-processing for the at least one application and determined according to one of a priority level of the at least one application and a priority level of the batching option information, and
wherein the controller is further configured to generate the batching data according to whether a predetermined batch-processing condition is satisfied, and wherein the predetermined batch-processing condition includes a memory capacity of the second processor, a transmission capacity between the first processor and the second processor, and a transmission speed between the first processor and the second processor.

24. The second processor of claim 23, wherein the data module is further configured to check the batching data configuration information, selectively acquire data based on the checked batching data configuration information, and store the acquired data.

25. The second processor of claim 24, wherein the data module is further configured to collect sensing data from the at least one sensor based on the batching data configuration information and calculate context data using the sensing data.

* * * * *